(12) United States Patent
Murakami et al.

(10) Patent No.: US 11,142,144 B2
(45) Date of Patent: Oct. 12, 2021

(54) WIRE HARNESS PROTECTOR AND HARNESS ASSEMBLY

(71) Applicant: SUMITOMO WIRING SYSTEMS, LTD., Mie (JP)

(72) Inventors: Sunao Murakami, Mie (JP); Kazunori Aimu, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/762,535

(22) PCT Filed: Nov. 21, 2018

(86) PCT No.: PCT/JP2018/042960
§ 371 (c)(1),
(2) Date: May 8, 2020

(87) PCT Pub. No.: WO2019/103030
PCT Pub. Date: May 31, 2019

(65) Prior Publication Data
US 2021/0178993 A1 Jun. 17, 2021

(30) Foreign Application Priority Data
Nov. 23, 2017 (JP) .............................. JP2017-225276

(51) Int. Cl.
*B60R 16/02* (2006.01)
*H02G 3/04* (2006.01)

(52) U.S. Cl.
CPC ....... *B60R 16/0215* (2013.01); *H02G 3/0418* (2013.01)

(58) Field of Classification Search
CPC .............. B60R 16/0215; H02G 3/0418; H02G 3/0437; H01R 13/74; H01R 13/50; H01R 2201/26
USPC ........................................................ 174/72 A
See application file for complete search history.

(56) References Cited

U.S. PATENT DOCUMENTS

| | | | |
|---|---|---|---|
| 7,378,592 B2 * | 5/2008 | Suzuki | B60R 16/0215 174/135 |
| 7,964,796 B2 * | 6/2011 | Suzuki | H02G 3/0437 174/72 C |
| 8,575,487 B2 * | 11/2013 | Agusa | B60R 16/0215 174/68.3 |

(Continued)

FOREIGN PATENT DOCUMENTS

| | | |
|---|---|---|
| JP | 2014-158313 A | 8/2014 |
| JP | 2017-147873 A | 8/2017 |
| JP | 2017-147913 A | 8/2017 |

OTHER PUBLICATIONS

International Search Report dated Feb. 5, 2019 for WO 2019/103030 A1 (3 pages).

*Primary Examiner* — Timothy J Thompson
*Assistant Examiner* — Michael F McAllister
(74) *Attorney, Agent, or Firm* — Abelman, Frayne & Schwab (57) ABSTRACT

A wire harness protector 10 that is used by being fixed to a wire harness 18 by a binding band 58 has a protector main body 12 and a lid body 16 having a cover part 90, and the cover part 90 covers a cut surface 64 of the binding band 58. A harness assembly is provided with the wire harness protector 10 and the wire harness 18.

8 Claims, 3 Drawing Sheets

(56) References Cited

U.S. PATENT DOCUMENTS

| | | | |
|---|---|---|---|
| 2006/0090920 A1* | 5/2006 | Fujita | B60R 16/0207 |
| | | | 174/72 A |
| 2012/0217033 A1* | 8/2012 | Agusa | B60R 16/0215 |
| | | | 174/68.3 |
| 2012/0266415 A1 | 10/2012 | Takeuchi et al. | |
| 2015/0121658 A1* | 5/2015 | Kamigaichi | B60R 16/0215 |
| | | | 24/16 PB |
| 2015/0294768 A1* | 10/2015 | Sakaki | H01B 13/01209 |
| | | | 174/68.3 |
| 2018/0208133 A1* | 7/2018 | Miyamura | B60R 16/0215 |
| 2018/0287355 A1* | 10/2018 | Nomura | H02G 3/0418 |

\* cited by examiner

WIRE HARNESS PROTECTOR AND HARNESS ASSEMBLY

CROSS REFERENCE TO RELATED APPLICATIONS

This application is a national phase of PCT application No. PCT/JP2018/042960, filed on 21 Nov. 2018, which claims priority from Japanese patent application No. 2017-225276, filed on 23 Nov. 2017, all of which are incorporated herein by reference.

TECHNICAL FIELD

The present invention relates to a wire harness protector and a harness assembly.

BACKGROUND

Heretofore, wire harnesses that are routed in vehicles such as cars are fixed to an appropriate place of the vehicle, in a state of being housed and held in an inserted state in a wire harness protector, as necessary, for purposes such as preventing interference with peripheral members in the region in which the wire harness is routed.

Incidentally, a fixing structure that prevents relative movement of the wire harness protector and the wire harness is provided in a harness outlet of the wire harness protector. For example, as described in JP 2014-158313A (Patent Document 1), a fixing structure in which a latch part that supports the wire harness is provided in the harness outlet of the wire harness protector to protrude outward from the harness outlet, and the wire harness is bound and fixed to this latch part using a binding band inserted and held in a binding band insertion hole provided in the latch part is widely used.

Note that the latch part is a portion that is provided to protrude from the wire harness protector. The binding band is passed through a hole provided in the latch part, and attached to the wire harness protector. For example, in JP 2014-158313A (Patent Document 1), a binding band holding part is the latch part.

PRIOR ART DOCUMENT

Patent Document

Patent Document 1: JP 2014-158313A

SUMMARY OF THE INVENTION

Problems to be Solved

Incidentally, the latch part is disposed on a side wall of a protector main body, for example. Given that the latch part is thereby provided to protrude outward from the wire harness protector, the binding band inserted and held in the binding band insertion hole of the latch part will also be externally exposed. Therefore, as shown in FIG. 2 of Patent Document 1, since the band cut surface of the binding band is unavoidably exposed externally, there is also a risk of an operator or user coming in contact with the band cut surface or the band cut surface coming in contact with other members when routing the wire harness.

The present invention has been made against the background of the abovementioned circumstances, and such problems are solved by providing a wire harness protector having a novel structure that is able to cover the cut surface of a binding band that is fixed to a harness outlet of the wire harness protector.

Means to Solve the Problem

As a result of the inventors of the present invention examining the fixing structure of a binding band that is fixed to a latch part of a wire harness protector, it became clear that, with a conventional harness protector, there is a risk of the cut surface of the binding band coming in contact with people or other members.

In view of this, the inventors examined shapes that can prevent the cut surface of a binding band that is fixed to a wire harness protector from coming in contact with people or other members. As a result, the inventors arrived at a shape that forms a cover part integrally with a lid body of the wire harness protector and covers the cut surface of the binding band. The cut surface of the binding band is thereby covered by the cover part. Accordingly, the wire harness protector of the present invention is configured to be able to advantageously prevent people or other members from coming in contact with the cut surface of the binding band. Also, given that the cut surface of the binding band can be covered with the cover part, an improvement in appearance can also be achieved. Furthermore, given that the cover part is provided in the lid body, the problem of the cut surface of the binding band coming in contact with people or other members can be solved, without an accompanying increase in the number of components or complexity of handling.

According to the present invention, a wire harness protector that is used by being fixed to a wire harness with a binding band is provided, the wire harness protector including a protector main body and a lid body having a cover part, and the cover part covering a cut surface of the binding band.

Effect of the Invention

According to the present invention, a wire harness protector that is able to advantageously prevent people or other members from coming in contact with the cut surface of a binding band is provided.

BRIEF DESCRIPTION OF THE DRAWINGS

The above object and other objects, features and advantages will become apparent from the following preferred embodiments and the accompanying drawings.

DETAILED DESCRIPTION TO EXECUTE THE INVENTION

Hereinafter, embodiments of the present invention will be described, with reference to the drawings. Note that the same reference numerals denote the same constituent elements throughout the drawings, and description will be omitted as appropriate.

A wire harness protector according to the present embodiment is used by being fixed to a wire harness with a binding band, and includes a protector main body, and a lid body having a cover part, with the cover part covering a cut surface of the binding band.

Use Application of Wire Harness Protector 10

The wire harness protector according to the present embodiment is, with regard to a wire harness for which space for disposition is difficult to secure or a wire harness that needs to avoid interference with peripheral components, preferable from the viewpoint of being able to prevent people or other members from coming in contact with the cut surface of the binding band.

The wire harness protector according to the present embodiment is effectively used in order to, for example, restrict the movement of a wire harness that is disposed between an engine and a vehicle body, and protect the wire harness. Wire harnesses that are disposed between an engine and a vehicle body face significant restrictions on space for the wire harness to be disposed, compared with other automotive wire harnesses, and there are calls to reduce the risk of the cut surface of the binding band coming in contact with people or other members at the time of disposition and after disposition. Using a wire harness protector according to the present embodiment with respect to such a wire harness that is disposed between the engine and the vehicle body is preferable from the viewpoint of being able to advantageously prevent the cut surface of the binding band from coming in contact with people or other members, and also being able to achieve an improvement in appearance.

Wire Harness Protector 10

Figure 3:
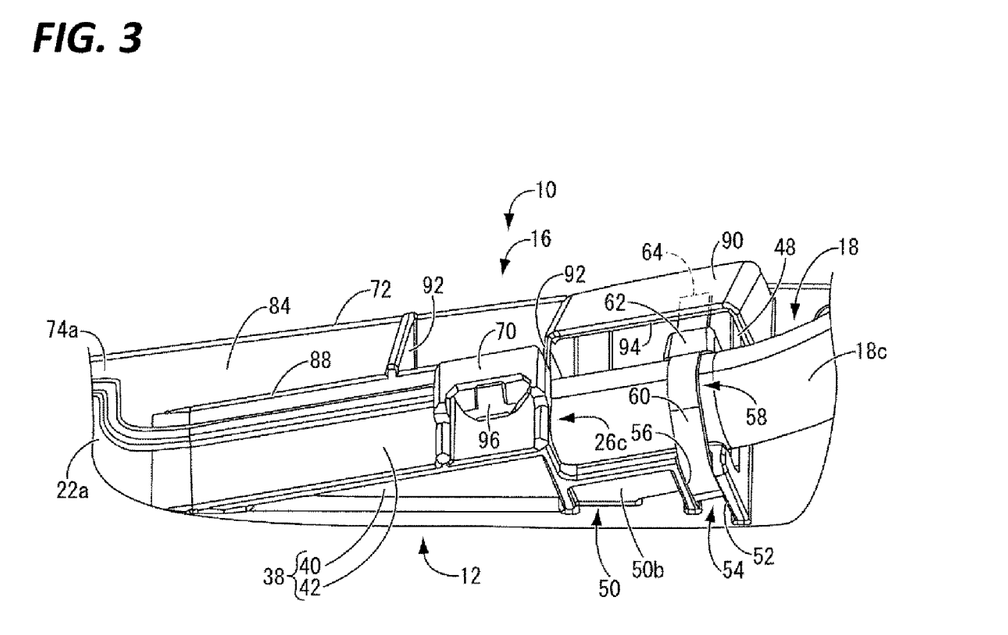
FIG. 3 is an enlarged perspective view of a middle part in FIG. 1 seen from diagonally below.
Figure 4:
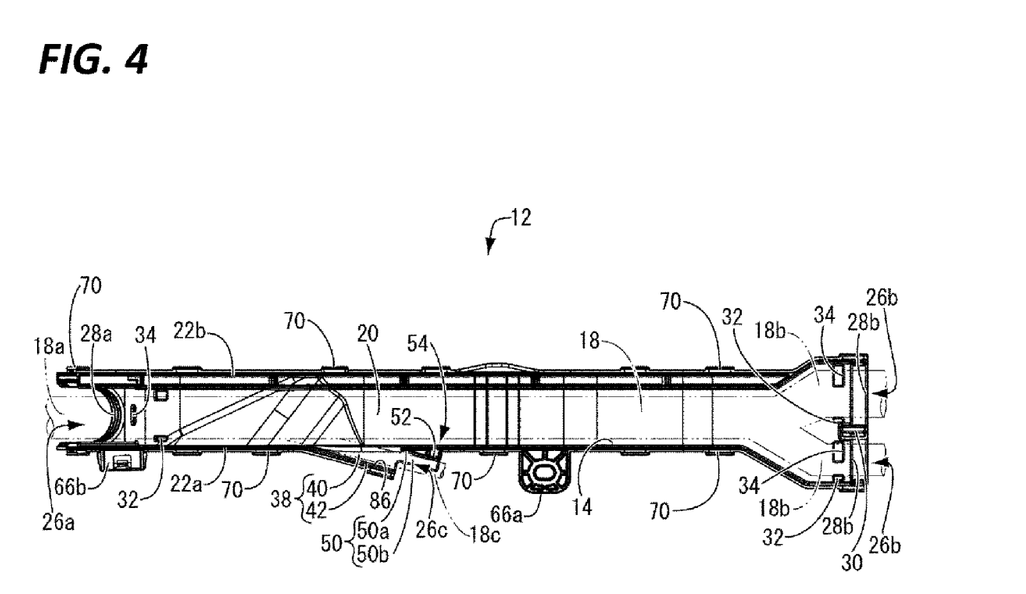
FIG. 4 is a plan view showing a protector main body of the wire harness protector of the embodiment shown in FIG. 1.
Figure 5:
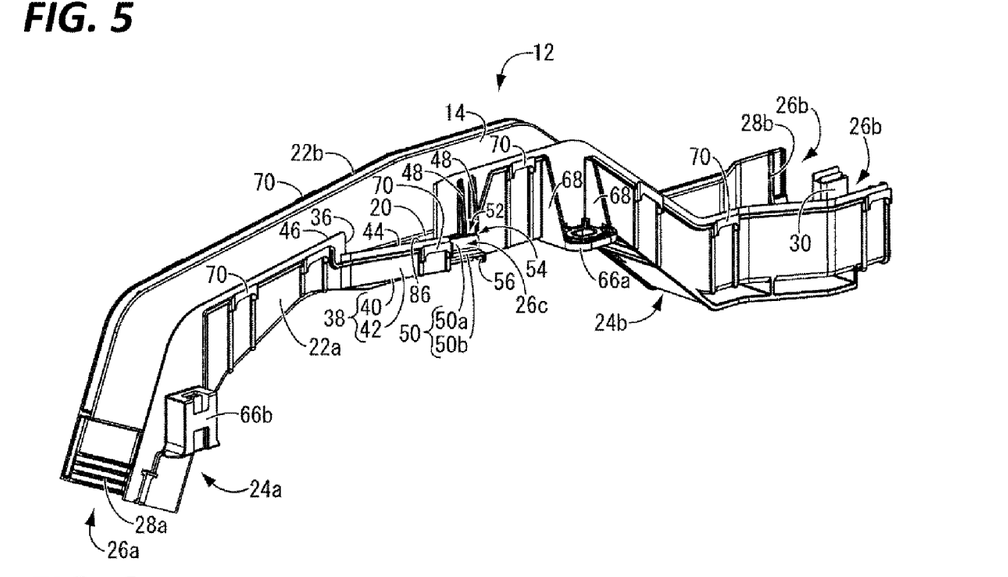
FIG. 5 is a perspective view showing the protector main body of the wire harness protector of the embodiment shown in FIG. 4.

A wire harness protector 10 serving as one embodiment of the present invention is shown in FIGS. 1 to 7. The wire harness protector 10 is constituted to have a protector main body 12 that extends in a gutter shape as shown in FIGS. 4 and 5, and a lid body 16 shown in FIGS. 6 and 7 that covers an upwardly open part 14 of the protector main body 12. Note that, in the present embodiment, a gutter is envisioned to be a groove opened in the upper surface that is semicircular, recessed, v-shaped or inverted trapezoidal in cross-sectional shape or a combination of grooves, for example.

This wire harness protector 10 is used to house a wire harness 18 in an inserted state within the protector main body 12.

Figure 1:
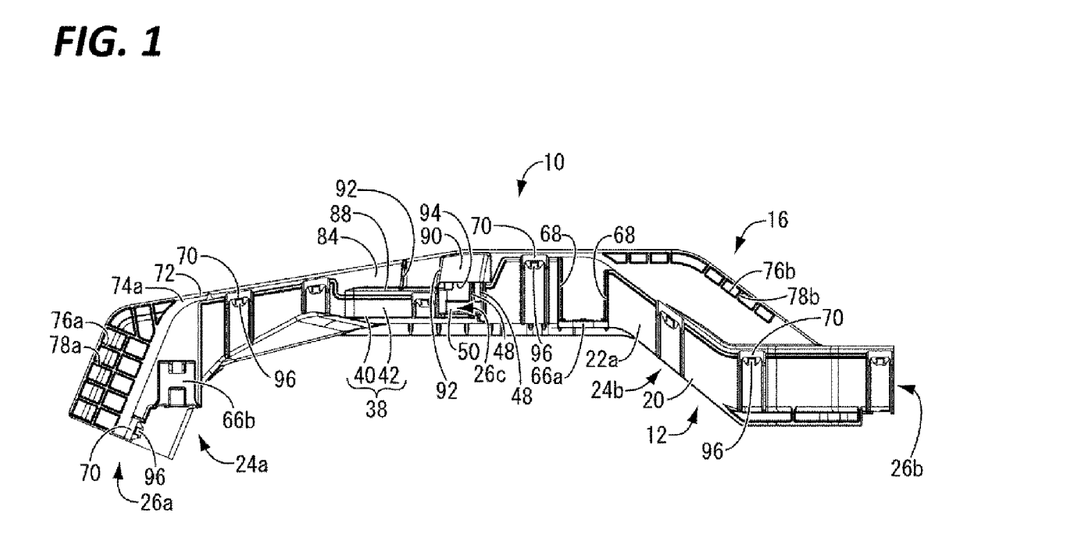
FIG. 1 is a side view showing a wire harness protector serving as one embodiment of the present invention.
Figure 2:
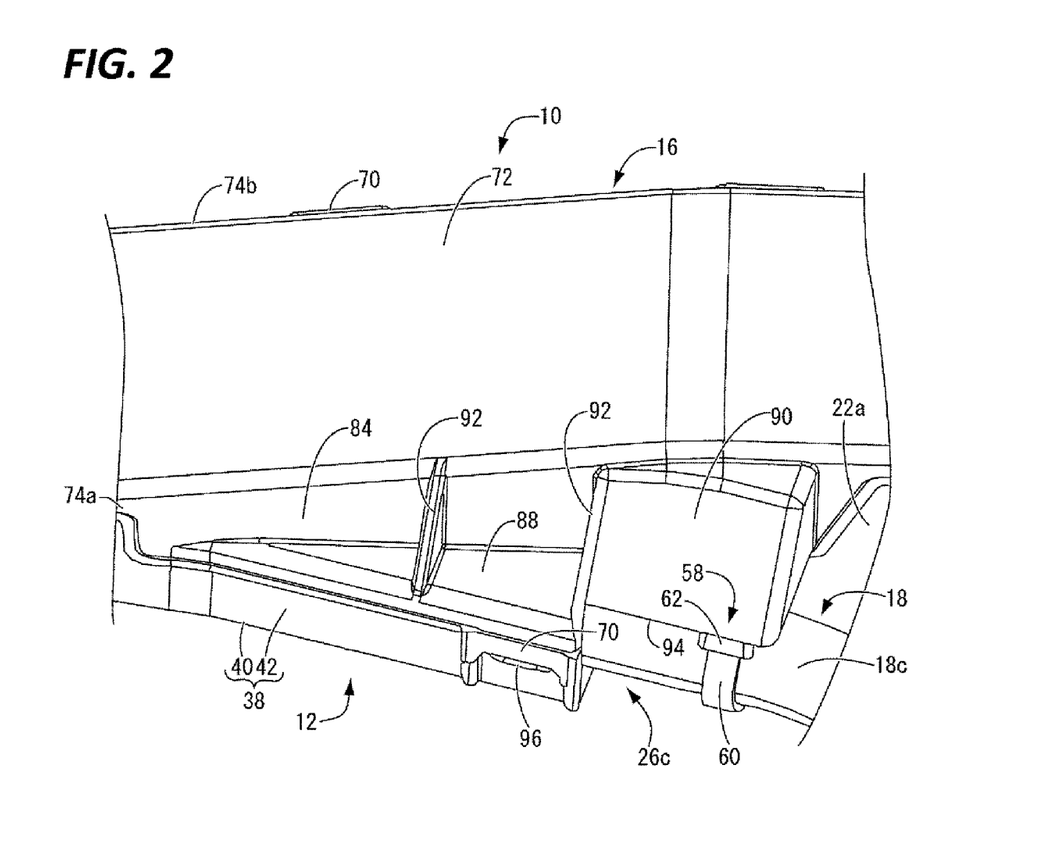
FIG. 2 is an enlarged perspective view of a middle part in FIG. 1 seen from diagonally above.

In the following description, upward means upward in FIG. 1, downward means downward in FIG. 1, frontward means leftward in FIG. 1 and rearward means rightward in FIG. 1. Note that in order to facilitate comprehension, the wire harness 18 is illustrated with a virtual line in FIG. 4.

Protector Main Body 12

As shown in FIGS. 4 and 5, the protector main body 12 is constituted to include a bottom wall 20 that extends in the length direction (left-right direction in FIGS. 4 and 5) of the wire harness 18, and a pair of side walls 22a and 22b that rise from both side edges of the bottom wall 20 in the width direction (up-down direction in FIG. 4), and to extend in a gutter shape. That is, the protector main body 12 has a pair of side walls 22a and 22b that extend in the length direction of the wire harness 18 and are disposed opposing each other in the width direction orthogonal to the length direction.

This protector main body 12 is integrally formed by a method such as injection molding with a synthetic resin such as polypropylene (PP) or polyamide (PA), for example. Note that there is no limitation to components separate from the protector main body 12 being attached to the protector main body 12, according to the position, shape and use application of the protector.

Also, as shown in FIG. 5, the protector main body 12 has downward sloping parts 24a and 24b in which both side end portions in the longitudinal direction (left-right direction in FIG. 4) of the protector main body 12 slope downward as a whole.

Main Line Harness Outlet 26a, Branch Harness Outlets 26b and 26c

As shown in FIG. 4, in the wire harness 18, a main line 18a extends in the longitudinal direction in a main line harness outlet 26a provided on the forward side (left side in FIG. 4), which is one side of the protector main body 12 in the longitudinal direction. On the other hand, branch harness outlets 26b and 26c are provided in two places on the rearward side (right side in FIG. 4), which is the other side of the protector main body 12 in the longitudinal direction. The branch harness outlets 26b are provided in the rear end of the protector main body 12, and the main line 18a divides in two and extends rearward in the longitudinal direction as two branch lines 18b and 18b, while the branch harness outlet 26c is provided in a middle part of the protector main body 12 in the longitudinal direction, and part of the main line 18a branches as a branch line 18c and extends rearward at an angle on the near side. In the main line harness outlet 26a, circumferentially-shaped protrusions 28a (four in the present embodiment) that protrude over approximately the entire circumference of the inner circumference of the bottom wall 20 and the pair of side walls 22a and 22b are provided. On the other hand, on the bottom wall 20 of the branch harness outlets 26b, a separation wall 30 that protrudes upward in an approximately rectangular cross-sectional shape in order to separate the two branch lines 18b and 18b is provided, and circumferentially-shaped protrusions 28b (two in the present embodiment) that protrude over approximately the entire circumference of the inner circumference of the separation wall 30, the bottom wall 20 and the side wall 22a and the separation wall 30, the bottom wall 20 and the side wall 22b are provided. Corrugated tubing (not shown) that protects the main line 18a and the branch lines 18b and 18b of the wire harness 18 that extend outward from the main line harness outlet 26a and the branch harness outlets 26b of the protector main body 12 is thereby fixable to the protector main body 12. Also, a retainer rib 32 that protrudes inward in an approximately rectangular cross-sectional shape on an inner surface of the side wall 22a of the protector main body 12 in the main line harness outlet 26a and the branch harness outlets 26b and an outer surface of the separation wall 30 on the side wall 22a side is provided. Due to an end surface of the corrugated tubing (not shown) abutting this retainer rib 32, the entry amount of the corrugated tubing into the protector main body 12 is restricted. Furthermore, a through hole 34 having an approximately rectangular cross-sectional shape and passing through in the plate thickness direction is formed in the bottom wall 20 of the protector main body 12 in the main line harness outlet 26a and the branch harness outlets 26b. It can thereby be easily checked that the corrugated tubing is inserted into the protector main body 12 by a predetermined entry amount even after assembly of the wire harness protector 10.

Branch Harness Holding Part 38

In addition, as shown in FIGS. 4 and 5, the branch harness outlet 26c is provided in the middle part of the protector main body 12 in the longitudinal direction. More specifically, the upper end side of the middle part in the longitudinal direction, which is part of the side wall 22a, out of the pair of side walls 22a and 22b of the protector main body 12, is cut out in an approximately rectangular shape in side view and a cutout part 36 is formed (refer to FIG. 5). At the lower end of the cutout part 36, a branch harness holding part 38 that protrudes outward in an approximately L-shaped cross-sectional shape and extends over approximately the entire length of the lower end in the longitudinal direction is provided, and the branch harness outlet 26c is formed at the tip of the branch harness holding part 38. This branch harness holding part 38 has a bottom wall 40 having an approximately triangular shape in plan view and a side wall 42 having an approximately long rectangular shape in side view and provided to protrude upward from the side edge of the bottom wall 40 on the outward side. The front end of the side wall 42 is joined to the side wall 22a of the protector main body 12 on the front end side of the cutout part 36, and the side wall 42 is formed to extend rearward at an angle on the near side. As a result, the amount by which the bottom wall 40 protrudes from the lower end of the cutout part 36 gradually increases rearward at an angle on the near side. Also, due to providing the cutout part 36, an open end surface 44 of the branch harness holding part 38 is located downward from an open end surface 46 of the protector main body 12.

Main Body Reinforcing Rib 48

Furthermore, as shown in FIGS. 4 and 5, on a part of the side wall 22a of the protector main body 12 on the rear end side of the cutout part 36 that is located in the vicinity of the branch harness outlet 26c, a pair of main body reinforcing ribs 48 and 48 that are provided to protrude outward in an approximately triangular planar shape in front view and extend in the protruding direction of the side wall 22a are provided to be separated from each other in the longitudinal direction of the protector main body 12. The main body reinforcing ribs 48 and the branch harness outlet 26c of the branch harness holding part 38 are joined by a harness support plate 50. The harness support plate 50 is formed to extend out to the main body reinforcing ribs 48 rearward at an angle on the near side from the branch harness outlet 26c in an approximately L-shaped cross-sectional shape. More specifically, the harness support plate 50 is configured to extend rearward at an angle outwardly from the side wall 22a of the protector main body 12 that defines the branch harness outlet 26c in an approximately long rectangular planar shape in side view. Furthermore, the harness support plate 50 has a vertical plate part 50a that joins the side wall 22a and the lower end side of the protruding end of the pair of main body reinforcing ribs 48 and 48, and a horizontal plate part 50b that is provided to protrude outward from the lower end of the vertical plate part 50a at a length that does not reach the side wall 42 of the branch harness holding part 38 and is integrally formed with the side wall 22a of the protector main body 12. A harness fixing part 54 that has a binding band insertion hole 52 having an approximately rectangular shape in plan view and open in the up-down direction is thus provided by the vertical plate part 50a of the harness support plate 50, the pair of main body reinforcing ribs 48 and 48, and the side wall 22a of the protector main body 12. That is, the binding band insertion hole 52 integrally formed with the main body reinforcing ribs 48 is provided to protrude on a part of the side wall 22a of the protector main body 12 that is located in the vicinity of the branch harness outlet 26c. This binding band insertion hole 52 is provided in order to fix the branch line 18c of the wire harness 18 to the harness fixing part 54 of the branch harness outlet 26c by inserting a band part 60 of a binding band 58 described later. The binding band insertion hole 52 can thereby be provided in a space efficient manner, by effectively utilizing the main body reinforcing ribs 48 of the protector main body 12 necessitated due to the cutout part 36 being provided in order to provide the branch harness holding part 38. Also, given that the branch line 18c of the wire harness 18 that is drawn out through the branch harness outlet 26c can be bound and fixed on the side wall 22a side of the protector main body 12 rather than conventionally with a latch part, the structure for fixing the branch line 18c can be configured more compactly. Moreover, given that it is not necessary to provide a latch part with which strength is difficult to secure with a narrow width in the branch harness outlet 26c, simplification of structure can also be achieved. In addition, on the back surface of the horizontal plate part 50b on the rearward side of the harness support plate 50, a binding band holding groove 56 having an approximately recessed groove shape that is open outward and downward with the binding band insertion hole 52 and stably holds the band part 60 to the horizontal plate part 50b is provided. The branch line 18c of the wire harness 18 is thereby supported from below by the horizontal plate part 50b of the harness support plate 50.

Binding Band 58

Here, a method of fixing the branch line 18c of the wire harness 18 to the branch harness holding part 38 of the wire harness protector 10 using the binding band 58 will be briefly described. This fixing operation is performed in a state where the wire harness 18 is housed in an inserted state within the protector main body 12. More specifically, the binding band 58, as is shown in FIG. 3, for example, is provided with the band part 60 formed in an elongated planar shape with a rectangular cross-section, and a head part 62 is integrally formed at one end of this band part 60 in the length direction. As is well known, the binding band 58 is integrally molded with a synthetic resin material, and curvature deformation of the band part 60 is possible. In the band part 60, a latching protrusion (not shown) is provided on one surface in the thickness direction, and a latching piece (not shown) is provided to protrude inside the insertion hole of the head part 62. After winding the band part 60 around the branch line 18c of the wire harness 18, and then inserting the band part 60 into the binding band insertion hole 52 of the wire harness protector 10 and running it through the binding band holding groove 56, the band part 60 is pulled tight and the latching protrusion of the band part 60 is latched onto the latching piece that is provided to protrude within the insertion hole. The branch line 18c of the wire harness 18 can thereby be fastened and fixed to the harness fixing part 54 of the wire harness protector 10. Note that, as shown in FIG. 3, in the binding band 58 after being fixed, the tip of the band part 60 is cut off, and a cut surface 64 is formed in the tip portion. The cut surface 64 of the band part 60 of the binding band 58 inserted through the binding band insertion hole 52 and bound and fixed to the branch line 18c of the wire harness 18 in this way is formed so as to face upward, and this cut surface 64 is covered from above by a cover part 90 of the lid body 16 described later.

Attachment Parts 66a and 66b

In addition, one attachment part 66a having an approximately rectangular planar shape in plan view (refer to FIG. 4) and to be fixed to a support body on the vehicle body side (not shown) is provided to protrude on the outer surface of the lower end of the side wall 22a on the rearward side (right side in FIGS. 4 and 5) of the cutout part 36. On both sides of the attachment part 66a in the length direction of the side wall 22a, a joining part 68 having an approximately triangular shape in front view (refer to FIG. 5) and joining the outer surface of the side wall 22a to each side of the attachment part 66a is provided. Also, another attachment part 66b having an approximately square tubular shape (refer to FIG. 5) and to be fixed to a support body on the vehicle body side (not shown) is provided to protrude on the outer surface of the front end (left end in FIGS. 4 and 5) of the side wall 22a.

Engaging Frame Body 70

Also, as shown in FIGS. 4 and 5, an engaging frame body 70 having an approximately square bracket shape in plan view and protruding outward is provided upward of the outer surface of the side walls 22a and 22b of the protector main body 12. Due to this engaging frame body 70 engaging an engaging piece 96 provided in the lid body 16 described later, a state where the upwardly open part 14 of the protector main body 12 is covered by the lid body 16 is stably held. Note that, as shown in FIG. 4, in the present embodiment, seven or eight engaging frame bodies 70 are respectively provided on the side walls 22a and 22b, but any number of engaging pieces may be respectively provided as necessary, separated in the longitudinal direction.

Lid Body 16

Figure 6:
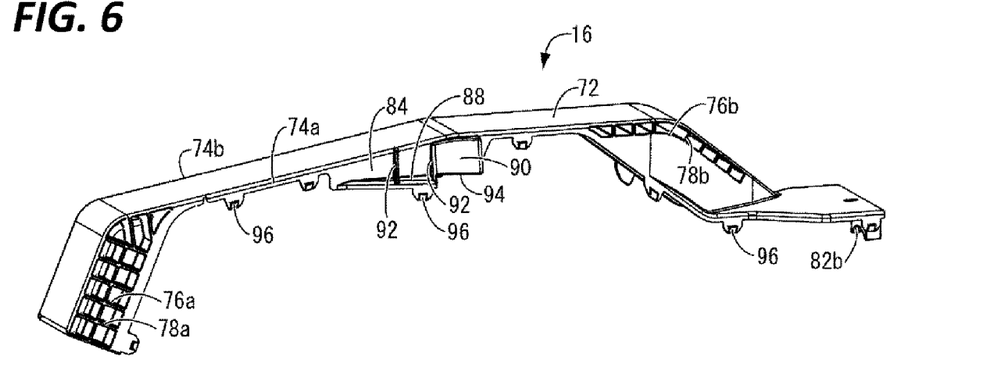
FIG. 6 is a perspective view showing a lid body of the wire harness protector of the embodiment shown in FIG. 1.
Figure 7:
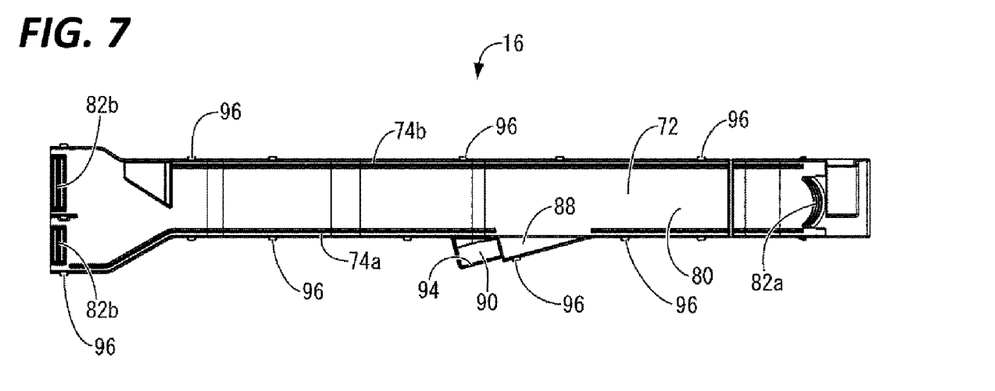
FIG. 7 is a bottom view showing the lid body of the wire harness protector of the embodiment shown in FIG. 6.

As shown in FIGS. 6 and 7, the lid body 16 is configured to extend in an approximately gutter shape and includes a ceiling wall 72 extending in the length direction (left-right direction in FIGS. 6 and 7) of the wire harness 18, and a pair of side walls 74a and 74b that protrude downward (downward in FIG. 6) from both side edges of the ceiling wall 72 in the width direction (up-down direction in FIG. 7). That is, the lid body 16 has the pair of side walls 74a and 74b that extend in the length direction of the wire harness 18 and are disposed opposing each other in the width direction orthogonal to the length direction. This lid body 16 is integrally formed by a method such as injection molding by a synthetic resin such as polypropylene (PP) or polyamide (PA), for example.

Reinforcing Ribs 78a and 78b

Also, as shown in FIGS. 6 and 7, in the side wall 74a on the front end side (left side in FIG. 6) of the lid body 16 in the longitudinal direction, lightening holes 76a having an approximately rectangular cross-sectional shape are open in the outer surface of the side wall 74a over approximately the entire surface, and are disposed to be separated by an approximately fixed distance in the longitudinal and lateral directions. An approximately lattice-shaped reinforcing rib 78a is formed between these lightening holes 76a by the lightening holes 76a. On the other hand, in the side wall 74a on the rear end side (right side in FIG. 6) of the lid body 16 in the longitudinal direction, lightening holes 76b having an approximately rectangular cross-sectional shape are provided over approximately the entire length of the ceiling wall 72. The lightening holes 76b are open in the outer surface of the side wall 74a, and are disposed to be separated by an approximately fixed distance in the length direction of the ceiling wall 72. An approximately lattice-shaped reinforcing rib 78b is formed between these lightening holes 76b by the lightening holes 76b. A reduction in members is thus possible, while maintaining the strength of the side wall 74a with these reinforcing ribs 78a and 78b.

Circumferentially-Shaped Protrusions 82a and 82b

Furthermore, as shown in FIG. 7, on the front end (left end in FIG. 7) and rear end (right end in FIG. 7) in a lower surface 80 of the ceiling wall 72 of the lid body 16, circumferentially-shaped protrusions 82a and 82b are provided to protrude at positions corresponding to the circumferentially-shaped protrusions 28a and 28b provided in the protector main body 12. The corrugated tubing (not shown) that protects the main line 18a and the branch lines 18b and 18b of the wire harness 18 can be fixed at the front end (left end in FIG. 1) and the rear end (right end in FIG. 1) of the wire harness protector 10, by these circumferentially-shaped protrusions 82a and 82b and the circumferentially-shaped protrusions 28a and 28b.

Vertical Wall Part 84, Branch Lid Body 88, Lid Body Reinforcing Rib 92

Also, as shown in FIGS. 1 and 2 and FIGS. 4 to 6, the side wall 74a of the middle part of the lid body 16 includes a vertical wall part 84 having an approximately rectangular planar shape in side view and extending vertically downward toward the branch harness holding part 38 from the open end surface 46 of the protector main body 12, and a branch lid body 88 (refer to FIGS. 2, 6-7) having an approximately triangular planar shape in plan view and provided to protrude outward from the vertical wall part 84 to cover the upwardly open part 86 (refer to FIGS. 4-5) of the branch harness holding part 38. In the middle part and the rear end of this branch lid body 88 in the longitudinal direction (left-right direction in FIGS. 1-2, 6), a lid body reinforcing rib 92 having an approximately triangular planar shape in front view (refer to FIGS. 1-2, 6) and reinforcingly supporting the branch lid body 88 on the vertical wall part 84 is provided to be joined to the branch lid body 88 and the vertical wall part 84.

Cover Part 90

Also, a cover part 90 having a bottomed box body shape with an approximately rectangular cross-section that opens downward and has a cross-sectional area that increases downward is provided to protrude outward on the vertical wall part 84 on the rear end side of the branch lid body 88. This cover part 90 is constituted to include the lid body reinforcing rib 92 provided at the rear end of the branch lid body 88 in the longitudinal direction (refer to FIGS. 1-3), and a downwardly open part 94 is provided upward of the vertical wall part 84. In this way, given that the branch lid body 88 is reinforcingly supported on the vertical wall part 84 by the lid body reinforcing rib 92, the strength of the branch lid body 88 is ensured and deformation such as warping is also suppressed, thus facilitating attachment of the branch lid body 88 to the upwardly open part 86 of the branch harness holding part 38. Moreover, given that the cover part 90 is constituted to include the lid body reinforcing rib 92, the cover part 90 whose rigidity and shape stability are ensured with a small number of components can be integrally molded with the lid body 16.

Engaging Piece 96

Note that, as shown in FIGS. 6 and 7, on the lower end of the outer surface of the side walls 74a and 74b of the lid body 16, a plurality of engaging pieces 96 having an approximately rectangular shape in side view and provided to protrude downward are formed to be flexurally deformable in the plate thickness direction. Due to these engaging pieces 96 engaging the engaging frame bodies 70 provided in the protector main body 12, the state in which the upwardly open part 14 of the protector main body 12 is covered by the lid body 16 is stably held. Also, due to the upwardly open part 14 of the protector main body 12 being covered with the lid body 16, the upwardly open part 86 of the branch harness holding part 38 is also covered by the branch lid body 88 of the lid body 16. Note that, as shown in FIG. 7, in the present embodiment, seven or eight engaging pieces 96 are respectively provided on the side walls 74a and 74b, but any number of engaging pieces may be respectively provided as necessary, separated in the longitudinal direction.

Wire Harness Protector 10

According to the wire harness protector 10 of the present embodiment having such a structure, the harness fixing part 54 is provided in the protector main body 12, rather than being provided in a latch part that protrudes outward from the harness outlet as with the conventional structure. Therefore, the cut surface 64 of the binding band 58 can be reliably covered by the cover part 90 provided in the lid body 16 that covers the upwardly open part 14 of the protector main body 12. That is, due to the cover part 90 being arranged upward of the binding band insertion hole 52 of the harness fixing part 54, the cut surface 64 of the band part 60 of the binding band 58 inserted through the binding band insertion hole 52 and bound and fixed to the branch line 18c of the wire harness 18 is covered from above by the cover part 90 of the lid body 16 (refer to FIG. 3). Given that this cut surface 64 is thereby prevented from being externally exposed, the problem of an operator or user touching the cut surface 64 or the cut surface 64 coming in contact with other members when routing the wire harness 18 is advantageously prevented. Also, given that the cut surface 64 can be covered by the cover part 90, an improvement in appearance can also be achieved. Furthermore, given that the cover part 90 is provided in the lid body 16, the cover part 90 can be added to the wire harness protector 10 comparatively easily, and the problem can be solved without an accompanying increase in the number of components or complexity of handling.

Also, given that the harness support plate 50, which joins the branch harness outlet 26c and the main body reinforcing ribs 48 in which the binding band insertion hole 52 is provided, is integrally formed with the side wall 22a of the protector main body 12, the harness support plate 50, which supports the branch line 18c of the wire harness 18 from below, can be provided while improving the strength of the side wall 22a of the protector main body 12. It is thereby possible to more stably support the branch line 18c of the wire harness 18, and to also ensure protection on the downward side of the branch line 18c of the wire harness 18. It is thereby possible to more stably support the branch line 18c of the wire harness 18, and to also ensure protection on the downward side of the branch line 18c of the wire harness 18.

In addition, the open end surface 44 of the branch harness holding part 38 is located downward from the open end surface 46 of the protector main body 12 due to the cutout part 36, and the cover part 90 is provided to protrude on the vertical wall part 84 extending toward the branch harness holding part 38 from the open end surface 46 of the protector main body 12. Given that the cover part 90 need not be provided to protrude outward of the wire harness protector 10, due to effectively utilizing the region upward of the branch harness holding part 38 in this way, the cover part 90 can be provided without an accompanying enlargement of the wire harness protector 10.

Harness Assembly

The wire harness protector according to the present embodiment can be used as a harness assembly provided with a wire harness protector and a wire harness, for example.

The present invention is not limited in terms of the wire harness, and a wire harness provided with a connector can be used. In the case of using a wire harness provided with a connector, some of the electric wire outlets and the connector may be fitted together, for example. In this case, the wire harness protector according to the present embodiment is able to exhibit performance as a connector cover, for example. This is preferable from the viewpoint of being able to realize protection of the connector in a space saving manner, while realizing prevention of contact with the cut surface of the binding band.

Although a plurality of embodiments of the present invention have been described in detail above, the present invention is not limited by the specific descriptions thereof. Variations, improvements and the like in a range that is able to achieve the object of the present invention are included in the invention. For example, in the above embodiments, in the wire harness protector 10 in which the branch harness holding part 38 is provided, the cover part 90 that covers the cut surface 64 of the binding band 58 that binds and fixes the branch line 18c of the wire harness 18 that is drawn out through the branch harness outlet 26c is provided in the lid body 16, but the present invention can be similarly realized by providing the cover part on a wire harness protector that does not have a branch harness holding part. Also, in the above embodiments, the harness fixing part 54 having the binding band insertion hole 52 is only provided in the branch harness outlet 26c, but the present invention is not limited thereto. The harness fixing part 54 having the binding band insertion hole 52 may be provided in other than the branch harness outlet 26c, or may be provided in all the harness outlets.

Hereinafter, an example of reference modes will be given.
1. A wire harness protector having a gutter-shaped protector main body through which a wire harness is inserted and a lid body covering an upwardly open part of the protector main body, and in which a harness fixing part having a binding band insertion hole is provided in a harness outlet provided in the protector main body, wherein the lid body has a cover part for covering, from above, a cut surface of the binding band inserted through the binding band insertion hole and bound and fixed to the wire harness.

2. The wire harness protector according to 1, wherein the protector main body includes a branch harness holding part extending in an L-shaped cross-sectional shape from a cutout part provided in a part of a side wall, the binding band insertion hole integrally formed with a main body reinforcing rib is provided to protrude on a part of the side wall of the protector main body that is located in a vicinity of a branch harness outlet provided in a tip of the branch harness holding part, and the cover part provided in the lid body is arranged upward of the binding band insertion hole.

3. The wire harness protector according to 2, wherein a harness support plate joining the branch harness outlet of the branch harness holding part and the main body reinforcing rib in which the binding band insertion hole is provided and supporting the wire harness from below is integrally formed with the side wall of the protector main body.

4. The wire harness protector according to 2 or 3, wherein an open end surface of the branch harness holding part is located downward from an open end surface of the protector main body, the lid body includes:

a vertical wall part extending toward the branch harness holding part from the open end surface of the protector main body; and a branch lid body protruding from the vertical wall part and covering an upwardly open part of the branch harness holding part, and the cover part protrudes on the vertical wall part.

5. The wire harness protector according to 4, wherein a lid body reinforcing rib reinforcingly supporting the branch lid body on the vertical wall part is provided to be joined to the branch lid body and the vertical wall part, and the cover part is configured to include the lid body reinforcing rib.

According to 1, a lid body has a cover part that covers, from above, a band cut surface of a binding band inserted through a binding band insertion hole and bound and fixed to the wire harness. Therefore, the cut surface of the binding band is prevented from being externally exposed, and the problem of an operator or user being injured or the band cut surface coming in contact with other members when routing the wire harness is advantageously prevented. Moreover, given that the cover part is provided in the lid body, the problem can be solved by adding the cover part, without an accompanying increase in the number of components or complexity of handling. Furthermore, given that the cut surface of the binding band can be covered with the cover part, an improvement in appearance can also be achieved.

According to 2, the main body reinforcing rib of the protector main body, which needs reinforcing due to the cutout part being provided in order to provide the branch harness holding part, is effectively utilized, enabling the binding band insertion hole to be provided in a space efficient manner. Moreover, given that the wire harness that is drawn out through the branch harness outlet can be bound and fixed on the side wall side of the protector main body, the structure for fixing the branch harness can be configured more compactly, and simplification of structure can also be achieved, due to not needing to provide a latch part with which strength is difficult to secure in the branch harness outlet.

According to 3, a harness support plate that joins the branch harness outlet and the main body reinforcing rib in which the binding band insertion hole is provided is integrally formed with the side wall of the protector main body, thus enabling a harness support plate that supports the wire harness from below while improving the strength of the side wall of the protector main body to be provided. The wire harness that is drawn out through the branch harness outlet can thereby be held in a more stable manner, and protection on the downward side of the wire harness can also be ensured.

According to 4, an open end surface of the branch harness holding part is located downward from an open end surface of the protector main body, and the cover part is provided to protrude on a vertical wall part extending toward the branch harness holding part from the open end surface of the protector main body. The cover part can thereby be provided, without an accompanying enlargement of the wire harness protector.

According to 5, given that the branch lid body is supported by the lid body reinforcing rib, and that the strength of the branch lid body is ensured and deformation such as warping is also suppressed, assembly of the branch lid body and the branch harness holding part is facilitated. Moreover, given that the cover part is constituted to include the lid body reinforcing rib, a cover part whose rigidity and shape stability are ensured with a small number of components can be integrally formed with the lid body.

What is claimed is:

1. A wire harness protector comprising:
   a protector main body configured to be fixed to a wire harness with a binding band and including a branch harness holder extending from a cutout portion provided in a portion of a side wall of the protector main body; and
   a lid body having a cover,
   wherein the cover covers a cut surface of the binding band, and
   a binding band insertion hole integrally formed with a main body reinforcing rib is provided to protrude on the side wall of the protector main body.

2. The wire harness protector according to claim 1, further comprising:
   a harness support plate joining a branch harness outlet and the main body reinforcing rib,
   wherein the harness support plate is integrally formed with the side wall of the protector main body.

3. The wire harness protector according to claim 1,
   wherein an open end surface of the branch harness holder is located downward from an open end surface of the protector main body, and
   the lid body includes:
   a vertical wall extending toward the branch harness holder from the open end surface of the protector main body; and
   a branch lid body protruding from the vertical wall and covering an upwardly opening of the branch harness holder.

4. The wire harness protector according to claim 3,
   wherein a lid body reinforcing rib reinforcingly supporting the branch lid body on the vertical wall is provided to be joined to the branch lid body and the vertical wall, and
   the cover includes the lid body reinforcing rib.

5. The wire harness protector according to claim 1, wherein the wire harness is a wire harness for an engine.

6. A harness assembly comprising:
the wire harness protector according to claim 1; and
the wire harness.

7. The wire harness protector according to claim 2, wherein the harness support plate is configured to extend rearward at an angle outwardly from the side wall of the protector main body that defines the branch harness outlet in a planar shape.

8. The wire harness protector according to claim 2, wherein the harness support plate includes a vertical plate that joins the side wall of the protector main body and a lower end of a protruding end of the main body reinforcing rib, and a horizontal plate that is provided to protrude outward from a lower end of the vertical plate.

* * * * *